United States Patent
Shimomura et al.

(10) Patent No.: US 9,944,809 B2
(45) Date of Patent: Apr. 17, 2018

(54) INK FOR INK-JET RECORDING, INK CARTRIDGE, AND INK-JET RECORDING PROCESS

(71) Applicant: CANON KABUSHIKI KAISHA, Tokyo (JP)

(72) Inventors: Naofumi Shimomura, Kawasaki (JP); Satoru Kobayashi, Yokohama (JP); Hideyuki Saito, Saitama (JP); Takahiro Mori, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 14/437,474

(22) PCT Filed: Oct. 10, 2013

(86) PCT No.: PCT/JP2013/006053
§ 371 (c)(1),
(2) Date: Apr. 21, 2015

(87) PCT Pub. No.: WO2014/064899
PCT Pub. Date: May 1, 2014

(65) Prior Publication Data
US 2015/0275008 A1 Oct. 1, 2015

(30) Foreign Application Priority Data

Oct. 23, 2012 (JP) .................................. 2012-234026
Sep. 20, 2013 (JP) .................................. 2013-195540

(51) Int. Cl.
| B41J 2/01 | (2006.01) |
| B41M 5/00 | (2006.01) |
| C09D 11/00 | (2014.01) |
| C09D 11/106 | (2014.01) |
| C09D 11/107 | (2014.01) |
| C09D 11/30 | (2014.01) |
| C09D 11/36 | (2014.01) |
| B41J 2/175 | (2006.01) |
| B41J 29/02 | (2006.01) |
| C09D 11/322 | (2014.01) |

(52) U.S. Cl.
CPC ............ *C09D 11/36* (2013.01); *B41J 2/1752* (2013.01); *B41J 2/17553* (2013.01); *B41J 29/02* (2013.01); *C09D 11/106* (2013.01); *C09D 11/107* (2013.01); *C09D 11/30* (2013.01); *C09D 11/322* (2013.01)

(58) Field of Classification Search
CPC ...... B41J 2/1752; B41J 2/17553; B41J 29/02; C09D 11/106; C09D 11/107; C09D 11/30; C09D 11/322; C09D 11/36
See application file for complete search history.

(56) References Cited

U.S. PATENT DOCUMENTS

2011/0043578 A1  2/2011 Tojo
2011/0069109 A1  3/2011 Tojo

FOREIGN PATENT DOCUMENTS

| CN | 1653099 A | 8/2005 |
| CN | 1752157 A | 3/2006 |
| EP | 1435380 A1 | 7/2004 |
| EP | 2270109 A1 | 1/2011 |
| JP | 2006-188601 A | 7/2006 |
| JP | 2006-520405 A | 9/2006 |
| JP | 2007-197525 A | 8/2007 |
| JP | 2007-231214 A | 9/2007 |
| JP | 2009-242481 A | 10/2009 |
| JP | 2011-042150 A | 3/2011 |
| JP | 2011-63001 A | 3/2011 |
| JP | 2012-201692 A | 10/2012 |
| WO | WO01-008895 A1 | 2/2001 |

*Primary Examiner* — Irina S Zemel
*Assistant Examiner* — Jeffrey S Lenihan
(74) *Attorney, Agent, or Firm* — Canon U.S.A., Inc. IP Division (57) ABSTRACT

The present invention provides an ink for ink-jet recording having high storage stability and high discharge stability and providing high abrasion resistance to the resulting image. The ink for ink-jet recording includes polymer particles. The polymer particles each include a first layer, a second layer, and a third layer from the inside to the outside in this order. The first layer is formed of an uncrosslinked first polymer, the second layer is formed of a crosslinked second polymer having ionizable groups, and the third layer is formed of units each having a hydrophilic part and a hydrophobic part.

17 Claims, 2 Drawing Sheets

INK FOR INK-JET RECORDING, INK CARTRIDGE, AND INK-JET RECORDING PROCESS

TECHNICAL FIELD

The present invention relates to an ink for ink-jet recording, an ink cartridge including the ink, and an ink-jet recording process using the ink.

BACKGROUND ART

Recently, the frequency of use of ink-jet recording apparatuses has been increasing in the fields of commercial printing and office printing with an improvement in image quality and an increase in recording rate. The inks for ink-jet recording used in these fields are required to show high performance, such as high storage stability and high discharge stability of the inks and high abrasion resistance of images. In order to achieve these requirements, inks containing polymer particles have been investigated (PTLs 1 to 4). PTL 1 describes an ink containing a pigment and polymer particles prepared by emulsion polymerization of a monomer having an ethylene unsaturated bond in the presence of a reactive surfactant. PTL 2 describes an ink containing a coloring agent and polymer particles having a reactive surfactant bonded to the surfaces and crosslinking. PTL 3 describes an ink containing polymer particles prepared by emulsion polymerization of a monomer having one ethylene unsaturated bond in each molecule and a monomer having two ethylene unsaturated bonds in each molecule in the presence of a reactive surfactant. PTL 4 describes an ink containing core-shell type polymer particles.

CITATION LIST

Patent Literature

PTL 1: Japanese Patent Laid-Open No. 2006-188601
PTL 2: PCT Japanese Translation Patent Publication No. 2006-520405
PTL 3: Japanese Patent Laid-Open No. 2009-242481
PTL 4: Japanese Patent Laid-Open No. 2012-201692

SUMMARY OF INVENTION

Technical Problem

The results of investigation by the present inventors demonstrate that though the inks containing polymer particles described in PTLs 1 to 4 have been improved in storage stability and discharge stability of the inks and in abrasion resistance of images, the improvement does not satisfy the levels required in the fields of commercial printing and office printing in recent years.

The present invention provides an ink for ink-jet recording having high storage stability and high discharge stability and providing high abrasion resistance to the resulting image. The invention also provides an ink cartridge containing the ink for ink-jet recording of the present invention and an ink-jet recording process using the ink.

Solution to Problem

The ink for ink-jet recording according to the present invention contains polymer particles each having a first layer, a second layer, and a third layer from the inside to the outside in this order. The first layer is formed of an uncrosslinked first polymer, the second layer is formed of a crosslinked second polymer having ionizable groups, and the third layer is formed of units each having a hydrophilic part and a hydrophobic part.

Advantageous Effects of Invention

An embodiment of the present invention can provide an ink for ink-jet recording having high storage stability and high discharge stability and providing high abrasion resistance to the resulting image. Another embodiment of the present invention can provide an ink cartridge containing the ink for ink-jet recording and an ink-jet recording process using the ink for ink-jet recording.

DESCRIPTION OF EMBODIMENTS

The present invention will now be described in detail by embodiments. The present inventors investigated why the ink for ink-jet recording containing monolayer polymer particles having a reactive surfactant bonded to the surfaces (hereinafter, also merely referred to as "ink") cannot simultaneously achieve high storage stability and high discharge stability of an ink and high abrasion resistance of an image. The details are shown below.

When the reactive surfactant bonded to the surfaces of polymer particles is not crosslinked, the particles are dispersed stably to some extent by the steric repulsion of the reactive surfactant, and clogging of the discharge port and adhesion of the polymer particles to the periphery of the discharge port are prevented even in the discharge of an ink containing such polymer particles by an ink-jet system, leading to a relatively high discharge stability of the ink. This is caused by that the surfactant contributing to the dispersion is bonded to the surfaces of the polymer particles and is therefore hardly detached even if a shear force is applied to the ink droplets during discharged.

It is known that the use of an ionic monomer having an ionizable group, such as an anionic group or a cationic group, as the monomer constituting polymer particles can further improve the discharge stability of an ink. Accordingly, the inventors used an ionic monomer as the monomer constituting polymer particles having a reactive surfactant bonded to the surfaces thereof. As a result, the dispersion was further stabilized by the repulsion due to the charge, in addition to the steric repulsion of the reactive surfactant described above, and the discharge stability of the ink was also improved. However, the dispersion stability of such polymer particles in the ink decreases over time of the storage, and in some inks, the storage stability of the ink decreases. The reasons of this are not obvious, but the present inventors presume as follows.

When an ink containing polymer particles having ionizable groups dispersed in water is stored, hydrophilic ionizable groups or polymer molecules having ionizable groups tend toward be highly oriented from the surfaces of the particles to the outside over time. Consequently, the oriented ionizable groups or polymer molecules having ionizable groups interact with each other between adjacent polymer particles to increase the viscosity, resulting in a reduction in the storage stability of the ink.

Based on the findings above, the present inventors have investigated a method of inhibiting the orientation of the ionizable groups and have arrived at a method of crosslinking polymer particles. Accordingly, the inventors have investigated polymer particles having ionizable groups, being crosslinked, and further having a reactive surfactant bonded to the surfaces thereof. However, the storage stability of the ink was further decreased, and the discharge stability was also decreased. A conceivable cause of the results is that the crosslinking inhibits the orientation of the ionizable groups but decreases the degree of freedom of the ionizable groups to reduce the thickness of the electric double layer of the whole polymer particles, resulting in a reduction in the electrostatic repulsion between the polymer particles. Another conceivable cause is crosslinking between particles.

Furthermore, crosslinking of the whole polymer particles prohibits formation of a film of the polymer particles when the ink is applied to a recording medium to reduce the abrasion resistance of the resulting image compared to the case of uncrosslinking.

As described above, in the case of using monolayer polymer particles having a reactive surfactant bonded to the surfaces thereof, it is difficult to simultaneously achieve high storage stability and discharge stability of the ink and high abrasion resistance of the resulting image.

Accordingly, the present inventors have variously investigated and have found that high storage stability and discharge stability of the ink and high abrasion resistance of the resulting image can be simultaneously achieved by the constitution of the present invention. The inventors presume the mechanism of providing these effects by the constitution of the present invention as follows.

In the present invention, the ink contains polymer particles each having a structure composed of at least three layers, a first layer, a second layer, and a third layer, from the inside to the outside. As a result, the functions of the layers synergistically act to simultaneously achieve the storage stability and the discharge stability of the ink and the abrasion resistance of the resulting image. Specifically, the polymer particles are stably dispersed by the steric repulsion due to the third layer having hydrophobic units and hydrophilic units and further by the electrostatic repulsion when the hydrophilic units have ionizable groups. In addition, crosslinking of the second layer prevents the ionizable groups from being oriented and allows the electrostatic repulsion by the ionizable groups to work, resulting in further stabilization of the dispersion of the polymer particles and an improvement in the discharge stability of the ink. However, since the first layer is not crosslinked, the polymer particles applied to a recording medium can readily form a film. As a result, high abrasion resistance of the resulting image can be achieved.

As the mechanism described above, the effects of the present invention can be achieved by synergistic effects of the constituent components.

Ink for Ink-Jet Recording

The ink for ink-jet recording of the present invention contains polymer particles and may further contain a color material, an aqueous solvent, and other components. In the present invention, the term "ink" includes an ink not containing any color material, i.e., a clear ink. Each component that can be contained in the ink of the present invention will now be described. Note that the terms "(meth)acrylic acid" and "(meth)acrylate" indicate "acrylic acid and methacrylic acid" and "acrylate and methacrylate", respectively.

Polymer Particles

In the present invention, the term "polymer particles" refers to a polymer present in a state of having a particle size. In the present invention, the polymer particles can be present in a state in which the particles are dispersed in an ink, i.e., in a state of a polymer emulsion. In the present invention, the polymer particles can have a volume-average particle diameter ($D_{50}$) of 25 nm or more and 600 nm or less, in particular, 50 nm or more and 300 nm or less. The polymer particles satisfying the constitutional requirements of the present invention can achieve the effects of the present invention even if the volume-average particle diameter ($D_{50}$) is relatively small, such as 50 nm or more and 100 nm or less. In the present invention, the volume-average particle diameter of polymer particles is measured using pure water containing the polymer particles with a nanotrac particle size analyzer, UPA-EX 150 (manufactured by Nikkiso Co., Ltd.), under conditions: SetZero: 30 s, number of measurements: three times, measuring time: 180 seconds, shape: spherical, and refractive index: 1.59.

In the present invention, the polymer particles can have a weight-average molecular weight (Mw) of 3000 or more and 1000000 or less in terms of polystyrene obtained by gel permeation chromatography (GPC).

In the present invention, the tetrahydrofuran-insoluble fraction (THF-insoluble fraction) of the polymer particles can be 80% or less. If the THF-insoluble fraction is larger than 80%, the abrasion resistance of the resulting image may not be sufficiently improved. In the present invention, the THF-insoluble fraction is calculated as follows: Dried polymer particles are immersed in THF at a solid content of 0.5% by mass, followed by stirring for 24 hours. The amount of the polymer particles remaining without being dissolved was measured, and the value of (mass of remaining polymer particles)/(the total mass of the immersed polymer particles) was calculated as the THF-insoluble fraction.

In the present invention, the polymer particles can have a surface electric charge of 1 micromole/$m^2$ or more and 500 micromole/$m^2$ or less, in particular, 50 micromole/$m^2$ or less. In the present invention, the surface electric charge of polymer particles is calculated as follows: Polymer particles are stirred in a hydrochloric acid solution having a pH of 2 for 24 hours, and the solid is then collected by centrifugation. The solid is pulverized, and 1 g thereof is put in 30 g of an aqueous 0.1 mol/L sodium hydrogen carbonate solution. The mixture is stirred for 15 hours, followed by centrifugation. One gram of the supernatant is diluted with pure water to 15 g. The diluted solution is titrated with a 0.1 mol/L hydrochloric acid using an automatic potentiometric titrator, AT510 (manufactured by Kyoto Electronics Manufacturing Co., Ltd.), to determine the amount of electric charge of the polymer particles. The surface electric charge is determined by dividing the amount of electric charge by the surface area calculated from the volume-average particle diameter measured above.

In the present invention, the polymer particles can have a glass transition temperature of 0 degree Celsius or more and 200 degrees Celsius or less. In particular, in a case of performing a heat-fixing step in image recording using the ink containing polymer particles of the invention, the glass transition temperature should be not higher than the heating temperature. The heating temperature in the heat-fixing step can be 25 degrees Celsius or more and 200 degrees Celsius or less. The glass transition temperature can be measured with a differential scanning calorimeter (DSC). Specifically, the glass transition temperature is measured as follows: Polymer particles are desiccated at 60 degrees Celsius, and 2 mg of the polymer particles are sealed in an aluminum container. The glass transition temperature is measured with a measuring apparatus, DSC Q1000 (manufactured by TA Instruments), under a temperature program (thermal analysis is performed while the temperature is increased by 10 degrees Celsius/min up to 200 degrees Celsius, then decreased by 5 degrees Celsius/min from 200 degrees Celsius to −50 degrees Celsius, and then increased by 10 degrees Celsius/min from −50 degrees Celsius to 200 degrees Celsius).

In the present invention, the polymer particle includes a first layer, a second layer, and a third layer from the inside to the outside in this order. The first layer of the polymer particle may be a core particle. In such a case, the polymer particle may have a second layer and a third layer from the core particle to the outside in this order. Alternatively, the polymer particle may have a first layer, a second layer, and a third layer from the core particle to the outside in this order. In the present invention, the third layer is bonded to the inner layer by chemical bonds, and a layer bonded to the inner layer by physisorption is excluded from the definition of the third layer. For example, in a case in which a surfactant is physically adsorbed to a polymer particle having a first layer and a second layer in this order, the surfactant is not included in the definition of the third layer. Furthermore, different layers may be disposed between each layer as long as the effects of the present invention are achieved. In also such cases, the first layer, the second layer, and the third layer should be disposed in this order. Furthermore, the polymer particle can be constituted of the three layers: the first layer, the second layer, and the third layer. Each layer will be described below.

First Layer

In the present invention, the first polymer forming the first layer of the polymer particle is uncrosslinked. In the present invention, the first polymer being "uncrosslinked" means that the THF-insoluble fraction of the first polymer is 25% or less. Accordingly, even if the first polymer is partially crosslinked, the first polymer is included in the definition of the "uncrosslinked" first polymer as long as the requirement for the THF-insoluble fraction is satisfied. The THF-insoluble fraction of the first polymer can be determined by calculating for only the first layer separated from the polymer particle by the method described above or for a polymer to be used as the first layer by the method described above.

The first layer of the first polymer in an uncrosslinked state can be formed by using an uncrosslinkable monomer as the monomer to be polymerized into the first polymer. Examples of the uncrosslinkable monomer include monomers each having only one ethylene unsaturated bond. Specific examples thereof include alkenes such as ethylene and propylene; (meth)acrylic acid; alkyl (meth)acrylates such as methyl (meth)acrylate, butyl (meth)acrylate, lauryl (meth)acrylate, and hexadecyl (meth)acrylate; and aromatic hydrocarbons such as styrene and allylbenzene. These monomers can be used alone or in combination of two or more thereof if necessary. Among these monomers, in particular, alkenes having 22 or less carbon atoms. (meth) acrylic acid, alkyl (meth)acrylates of which alkyl groups having 22 or less carbon atoms, and styrene, especially, alkyl (meth)acrylates of which alkyl groups having 12 or less carbon atoms, can be used.

As described above, a crosslinkable monomer satisfying the requirement for the THF-insoluble fraction can also be used. Specific examples of such crosslinkable monomer are described below. In such a case, the amount of the crosslinkable monomer should be 5% by mass or less, in particular, 2% by mass or less, based on the total amount of the monomers used for the first layer. The amount of the crosslinkable monomer can be 0% by mass, that is, the first layer can be synthesized without using any crosslinkable monomer, i.e., from only an uncrosslinkable monomer.

In the present invention, the ratio of the first layer to the polymer particle can be 30% by mass or more and 90% by mass or less.

Second Layer

In the present invention, the second polymer forming the second layer of the polymer particle is crosslinked and has ionizable groups. In the present invention, the second polymer being "crosslinked" means that the THF-insoluble fraction of the second polymer is higher than 25%. The THF-insoluble fraction of the second polymer can be determined by calculating for only the second layer separated from the polymer particle by the method described above or for a polymer to be used as the second layer by the method described above.

The second layer of the second polymer in a crosslinked state can be formed by using a crosslinkable monomer as the monomer to be polymerized into the second polymer. Examples of the crosslinkable monomer include monomers each having two or more ethylene unsaturated bonds. Specific examples thereof include dienes such as butadiene and isoprene; alkynes such as acetylene; bifunctional alkyl (meth)acrylates such as 1,4-butanediol diacrylate, nonanediol diacrylate, diethylene glycol diacrylate, polyethylene glycol diacrylate, polypropylene glycol diacrylate, BO-modified bisphenol A diacrylate, polytetramethylene glycol diacrylate, 2-hydroxy-3-acryloyloxypropyl methacrylate, propoxylated ethoxylated bisphenol A diacrylate, ethoxylated bisphenol A diacrylate, 9,9-bis(4-(2-acryloyloxyethoxy)phenyl)fluorene, tricyclodecanedimethanol diacrylate, 1,10-decanediol diacrylate, 1,6-hexanediol diacrylate, 1,9-nonanediol diacrylate, dipropylene glycol diacrylate, tripropylene glycol diacrylate, ethylene glycol dimethacrylate, 1,4-butanediol dimethacrylate, neopentyl glycol dimethacrylate, polyethylene glycol dimethacrylate, EO-modified bisphenol A dimethacrylate, polytetramethylene glycol dimethacrylate, diethylene glycol dimethacrylate, triethyl glycol dimethacrylate, ethoxylated bisphenol A dimethacrylate, tricyclodecanedimethanol dimethacrylate, 1,6-hexanediol dimethacrylate, 1,9-nonanediol dimethacrylate, ethoxylated polypropylene glycol dimethacrylate, and glycerin dimethacrylate; trifunctional alkyl (meth)acrylates such as tris(2-acryloyloxyethyl)isocyanurate, trimethylol propane triacrylate, tris(2-hydroxyethyl)isocyanurate triacrylate, ethoxylated trimethylol propane acrylate, pentaerythritol triacrylate, propoxylated trimethylol propane triacrylate, propoxylated glyceryl triacrylate, ethoxylated isocyanurate triacrylate, epsilon-caprolactone-modified tris (2-acryloxyethyl)isocyanurate, pentaerythritol acrylate, trimethylol propane triacrylate, EO-modified trimethylol propane trimethacrylate, and trimethylol propane trimethacrylate; and tetrafunctional alkyl (meth)acrylates such as ditrimethylol propane tetraacrylate, ethoxylated pentaerythritol tetraacrylate, and pentaerythritol tetraacrylate. These monomers can be used alone or in combination of two or more thereof if necessary. Among these monomers, in particular, 1,4-butanediol diacrylate, 1,4-butanediol dimethacrylate, diethylene glycol diacrylate, polyethylene glycol diacrylate, ethylene glycol dimethacrylate, polyethylene glycol dimethacrylate, diethylene glycol dimethacrylate, and triethyl glycol dimethacrylate, especially, 1,4-butanediol dimethacrylate and ethylene glycol dimethacrylate, can be used.

The second polymer can have ionizable groups by using a monomer having an ionizable group such as an anionic group or a cationic group, in particular, an anionic group, as the monomer to be polymerized into the second polymer in the present invention.

Examples of the monomer having an ionizable group include (meth)acrylic acid and 2-(acryloyloxy)ethyltrimethylaminmonium chloride. These monomers can be used alone or in combination of two or more thereof if necessary. Among these monomers, in particular, (meth)acrylic acid can be used.

In the present invention, the polymer can be a copolymer of a crosslinkable monomer and a monomer having an ionizable group exemplified above, that is, the polymer can have units derived from the crosslinkable monomer and units derived from the monomer having an ionizable group. In this case, the copolymerization ratio can be such that the mass ratio of the units derived from the crosslinkable monomer to the units derived from the monomer having an ionizable group in the second polymer is 0.20 or more and 50 or less.

In the present invention, the ratio of the second layer to the polymer particle can be 5% by mass or more and 65% by mass or less.

The second layer is disposed so as to cover the first layer, but may not completely cover the first layer. Specifically, the second layer should cover 20% or more of the surface area of the first layer and can cover 50% or more or 70% or more of the surface area of the first layer.

The second layer can have a thickness of 1 nm or more. The thickness of the first layer can be 5 to 1000 times, in particular, 5 to 60 times, the thickness of the second layer. In a case that the first layer is the central layer of the polymer particle, i.e., the core particle, the particle diameter of the core particle is the thickness of the first layer. The thickness of each layer can be determined by directly measuring the particle diameter at each step of forming the polymer layer. For example, the thickness of the second layer can be determined from the difference between the particle diameter of a polymer particle having only the first layer and the particle diameter of the polymer particle after formation of the second layer. Alternatively, the thickness can be indirectly calculated from weight of the prepared polymer particles.

Third Layer

In the present invention, the third layer is formed of units each having a hydrophilic part and a hydrophobic part. In the present invention, examples of the "hydrophilic part" include a hydroxyl group, ionizable groups, a methylene oxide group, and an ethylene oxide group. Examples of the "hydrophobic part" include alkyl groups, aryl groups, and alkylene oxide groups having 3 or more carbon atoms. Accordingly, the unit can have each one selected from these examples. In the present invention, the "unit having a hydrophilic part and a hydrophobic part" can be a unit derived from a reactive surfactant.

In the present invention, the "reactive surfactant" refers to a compound at least having a hydrophilic part, a hydrophobic part, and an ethylene unsaturated bond in each molecule.

In the present invention, the reactive surfactant is introduced into the polymer particle through a chemical bond with the polymer in the first layer or the second layer by the ethylene unsaturated bond. That is, the unit derived from the reactive surfactant is chemically bonded to at least one of the first layer and the second layer.

Examples of the reactive surfactant include compounds in which any of a methacryloyl group, an acryloyl group, a maleyl group, a vinyl group, and an aryl group is bonded to the inside or an end of a polyoxyalkylene alkyl ether molecule. Specific examples thereof include polyoxyethylene nonylpropenylphenyl ethers such as Aqualon series RN-20, RN-30, and RN-50 (manufactured by Dai-ichi Kogyo Seiyaku Co., Ltd.); polyoxyethylene nonylpropenylphenyl ether ammonium sulfate such as Aqualon series HS-10. BC-0515, BC-10, and BC-20 (manufactured by Dai-ichi Kogyo Seiyaku Co., Ltd.); polyoxyethylene-1-(allyloxymethyl)alkyl ether ammonium sulfate such as Aqualon series KH-05 and KH-10 (manufactured by Dai-ichi Kogyo Seiyaku Co., Ltd.); alphahydro-omega-(1-alkoxymethyl-2-(2-propenyloxyl)ethoxy)-poly(oxy-1,2-ethanediyl) such as Adeka Reasoap series ER-10, ER-20, ER-30, and ER-40 (manufactured by Adeka Corporation); alpha[1-[(allyloxy)methyl]-2-(nonylphenoxy)ethyl]-omega-hydroxypolyoxyethylene such as Adeka Reasoap series NE-10, NE-20, NE-30, NE-40, and NE-50 (manufactured by Adeka Corporation); alphasulfo-omega-(1-alkoxymethyl-2-(2-propenyloxyl)ethoxy)-poly(oxy-1,2-ethanediyl)ammonium salts such as Adeka Reasoap series SR-10S, SR-10, SR-20, SR-3025, SE-10N, and SE-20N (manufactured by Adeka Corporation); 2-sodium sulfoethyl methacrylate such as Antox series MS-2N (manufactured by Nippon Nyukazai Co., Ltd.); bis(polyoxyethylene polycyclic phenyl ether) methacrylate sulfate such as Antox series MS-60 (manufactured by Nippon Nyukazai Co., Ltd.); alkoxypolyethylene glycol methacrylates such as Antox series LMA-10, LMA-20, and LMA-27 (manufactured by Nippon Nyukazai Co., Ltd.); alkoxypolyethylene glycol maleates such as Antox series SMH-20, LMH-20, and EMH-20 (manufactured by Nippon Nyukazai Co., Ltd.); polyoxyalkylene alkenyl ethers such as Latemul series PD-420, PD-430, and PD-450 (manufactured by Kao Corporation); polyoxyalkylene alkenyl ether ammonium sulfates such as Latemul series PD-105 (manufactured by Kao Corporation); vinyl ether alkoxylates such as Emulsogen series R208 and R307 (manufactured by Clariant Co., Ltd.); alkyl allyl sulfosuccinates such as Eleminol series JS-20 (manufactured by Sanyo Chemical Industries, Ltd.), polyoxyalkylene methacrylate sulfate such as Eleminol series RS-3000 (manufactured by Sanyo Chemical Industries, Ltd.); and unsaturated phosphate esters such as Maxemul series 6106 and 6112 (manufactured by Croda Inc.).

In the present invention, the ratio of the third layer to the polymer particle can be 1% by mass or more and 20% by mass or less.

Process of Producing Polymer Particles

The polymer particles may be produced by any method as long as the polymer particles satisfy the constitutional requirements of the present invention. Examples of the method include emulsion polymerization, pre-emulsion polymerization, seed polymerization, and phase-transfer emulsification.

As a typical example, a process of producing polymer particles using an uncrosslinkable monomer for constituting the first layer, a crosslinkable monomer and a monomer having an ionizable group for constituting the second layer, and a reactive surfactant for the third layer will now be specifically described.

In the present invention, the polymer particles are produced by a process including a step of preparing a dispersion containing an uncrosslinked polymer through emulsion polymerization of an uncrosslinkable monomer and a step of adding a monomer having an ionizable group, a crosslinkable monomer, and a reactive surfactant to the dispersion and performing polymerization.

Color Material

In the present invention, examples of the color material include pigments and dyes. The pigment or the dye may be any known one. In the present invention, from the viewpoint of water resistance of the resulting image, a pigment can be used. The content (% by mass) of the color material can be 0.1% by mass or more and 15.0% by mass or less, in particular, 1.0% by mass or more and 10.0% by mass or less, based on the total mass of the ink.

In the present invention, in a case of using a pigment as the color material, a pigment dispersion can be prepared by using, for example, a polymer-dispersion-type pigment using a polymer as a dispersant (a polymer-dispersed pigment using a polymer dispersant, a microcapsule pigment of which particle surface is coated with a polymer, or a polymer-binding pigment of which particle has a surface to which organic groups including a polymer are chemically bonded) or a self-dispersion-type pigment of which particle has a surface to which a hydrophilic group is introduced (self-dispersible pigment). A combination of pigment dispersions prepared by different methods may be used. Specific examples of the pigment include carbon black and organic pigments. The pigments may be used alone or in combination of two or more thereof. In a case of using the polymer-dispersion-type pigment as the pigment of an ink, a polymer is used as a dispersant. The polymer used as a dispersant can have both a hydrophilic part and a hydrophobic part. Specific examples of the polymer include acrylic polymers prepared by polymerization of a monomer having a carboxyl group, such as acrylic acid or methacrylic acid; and urethane polymers prepared by polymerization of a diol having an anionic group, such as dimethylol propionic acid. The polymer used as a dispersant can have an acid value of 50 mg KOH/g or more and 300 mg KOH/g or less and a weight-average molecular weight (Mw) of 1000 or more and 15000 or less in terms of polystyrene obtained by GPC. The content (% by mass) of the polymer dispersant in an ink can be 0.1% by mass or more and 10.0% by mass or less, in particular, 0.2% by mass or more and 4.0% by mass or less, based on the total mass of the ink. The mass ratio of the content (% by mass) of the polymer dispersant to the content (% by mass) of the pigment can be 0.1 or more and 1.0 or less.

In the present invention, in a case of using a dye as the color material, a dye having water solubility by having an anionic group, such as a sulfonate group or a carboxy group, can be used. Specific examples of the dye include acid dyes, direct dyes, and reactive dyes listed in the Colour Index. In addition, dyes at least having anionic groups, such as a sulfonate group and a carboxy group, can be used, even if they are not listed in the Color Index.

Aqueous Solvent

The ink of the present invention can contain water or an aqueous solvent, which is a solvent mixture of water and a water-soluble organic solvent. The content (% by mass) of the water-soluble organic solvent in an ink can be 3.0% by mass or more and 50.0% by mass or less based on the total mass of the ink. The water-soluble organic solvent may be any one that is usually used. Examples thereof include alcohols, glycols, alkylene glycols, polyethylene glycols, nitrogen-containing compounds, and sulfur-containing compounds. These water-soluble organic solvents may be used alone or in combination of two or more thereof if necessary. Water should be deionized water (ion-exchanged water). The content (% by mass) of water in an ink can be 50.0% by mass or more and 95.0% by mass or less based on the total mass of the ink.

Other Components

The ink of the present invention may contain a polyol such as trimethylol propane or trimethylol ethane; a urea derivative such as urea or ethylene urea; or a water-soluble organic compound that is a solid at ordinary temperature, if necessary, in addition to the components described above. The ink of the present invention may further contain various auxiliaries such as a surfactant, a pH adjuster, a corrosion inhibitor, an antiseptic agent, an antifungal agent, an antioxidant, a reduction inhibitor, an evaporation accelerator, a chelating agent, and a polymer other than the polymer particle, if necessary. In particular, in the case of an ink containing a color material, the pH thereof should be adjusted with a pH adjuster within a range of 6 or more and 10 or less.

Ink Cartridge

The ink cartridge of the present invention includes an ink storage portion for storing an ink, and the above-described ink of the present invention is stored in the ink storage portion. In an example of the structure of the ink cartridge, the ink storage portion is composed of an ink storage chamber for storing a liquid ink and a negative pressure generating member-containing chamber for containing a negative pressure generating member that retains the ink therein by a negative pressure. The ink cartridge may have a structure in which an ink storage portion is configured so that the negative pressure generating member retains the whole quantity of the ink contained without having the ink storage chamber for storing a liquid ink. Furthermore, the ink cartridge may be configured so as to have an ink storage portion and a recording head.

Ink-Jet Recording Process

In the ink-jet recording process of the present invention, an ink is discharged from a recording head by applying thermal energy to the ink, wherein the ink of the present invention is used. The term "recording" in the present invention includes an embodiment of recording onto a recording medium with the ink of the present invention and an embodiment of printing on an ink-impermeable base material such as glass, a plastic, or a film with the ink of the present invention. Examples of the recording medium include plain paper and glossy paper, which has a porous ink-receiving layer containing an inorganic pigment and a binder on an air-permeable support (such as paper).

Figure 1:
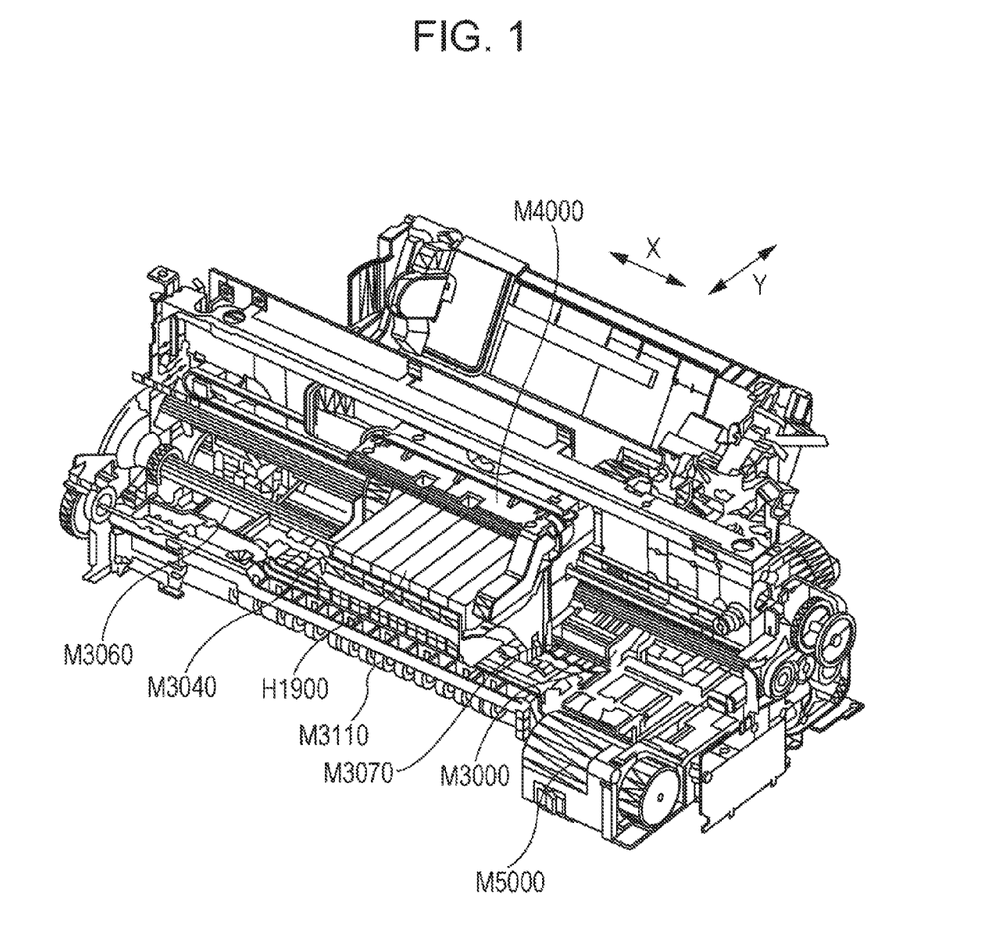
FIG. 1 is a perspective view of the mechanical section of an ink-jet recording apparatus.

FIG. 1 is a perspective view of the mechanical section of an ink-jet recording apparatus. In feeding of paper, in a paper feeding unit including a paper feeding tray, a predetermined number of sheets of a recording medium are sent to a nip unit constituted of a paper feeding roller and a separation roller. The sheets of the recording medium are separated at the nip unit, and only the uppermost sheet of the recording medium is conveyed. The recording medium conveyed to a conveying unit is guided by a pinch roller holder M3000 and a paper guide flapper and is sent to a pair of rollers, a conveying roller M3060 and a pinch roller M3070. The pair of rollers consisting of the conveying roller M3060 and the pinch roller M3070 are rotated by driving of an LF motor, and this rotation conveys the recording medium onto a platen M3040.

In recording of an image, the recording head is sent to a target image-forming position by a carriage unit, and an ink is discharged onto the recording medium in accordance with the signals from an electric substrate. In the ink-jet recording apparatus, main-scanning by the carriage M4000 in the column direction and sub-scanning for conveying the recording medium in the row direction by the conveying roller M3060 are alternately performed while performing recording with the recording head to form an image on the recording medium. The recording medium provided with the image is nipped between a nip of a first paper-ejecting roller M3110 and a spur at a paper-ejecting unit and is conveyed and ejected to a paper-ejecting tray.

Figure 2:
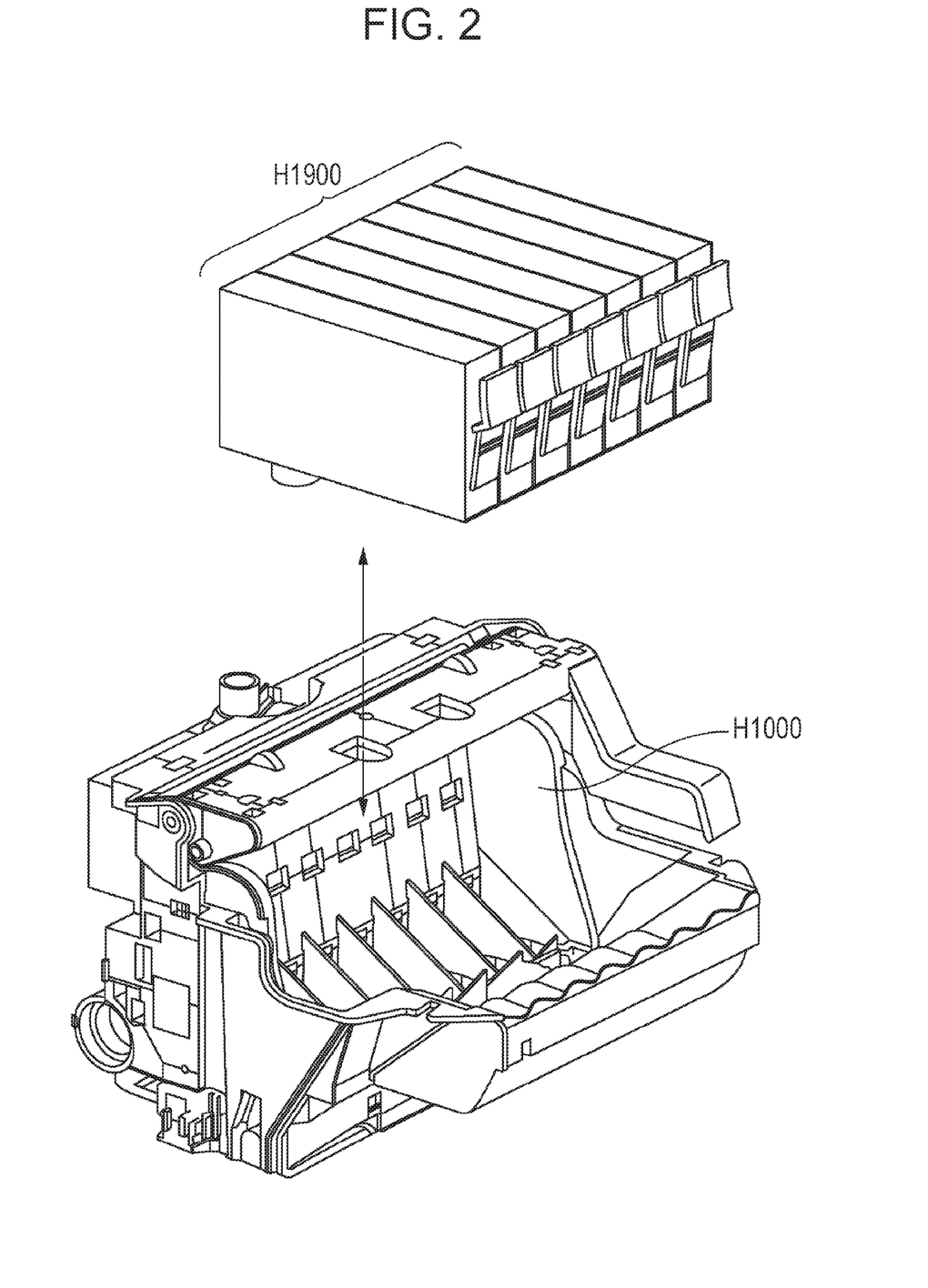
FIG. 2 is a perspective view of illustrating a state of ink cartridges to be installed in a head cartridge.

FIG. 2 is a perspective view of illustrating a state of ink cartridges H1900 to be installed in a head cartridge H1000. In FIG. 2, ink cartridges H1900 corresponding to a plurality of inks are independently prepared. The ink cartridges H1900 are each detachable from the head cartridge H1000. The ink cartridges H900 can be attached to or detached from the head cartridge H1000 in a state of being mounted on a carriage M5000.

EXAMPLE

The present invention will now be more specifically described by examples and comparative examples, but is not limited to the following examples, within the scope of the present invention. In the following examples, the term "part(s)" is on a mass basis unless otherwise specified.
Preparation of Polymer Particle Dispersion Polymer particle dispersions were prepared by the processes described below. The resulting polymer particle dispersions were each subjected to measurement of volume-average particle diameter ($D_{50}$) of the polymer particles contained therein, surface electric charge, and THF-insoluble fraction by the methods described above. The results are shown in Tables I and 2. In polymer particle dispersions 1 to 30, 34, and 35, the THF-insoluble fractions of the polymers constituting the first layers calculated by the method described above were each 25% or less, whereas the THF-insoluble fractions of the polymers constituting the second layer were each higher than 25%. That is, the results demonstrate that the first layers were each not crosslinked and that the second layers were each crosslinked.
Preparation of Polymer Particle Dispersion 1

A mixture of 35.0 parts of butyl methacrylate, 2.0 parts of n-hexadecane as hydrophobe, and 2.0 parts of 2,2'-azobis-(2-methylbutyronitrile) was stirred for 30 min. The mixture solution was dropwise added to 61.0 parts of an aqueous solution of 5.0% by mass of Nikkol BC15 (manufactured by Nikko Chemicals Co., Ltd.) as a polyoxyethylene cetyl ether, followed by stirring for 30 minutes. Subsequently, the mixture solution was subjected to dispersion treatment with an ultrasonic processor, S-150D Digital Sonifier (manufactured by Branson Co.), under conditions of 400 W and 20 kHz for 3 hours, followed by polymerization under a nitrogen atmosphere at 80 degrees Celsius for 4 hours to give a dispersion of the first layer for polymer particles.

Subsequently, 73.0 parts of the dispersion of the first layer prepared above was heated to 70 degrees Celsius under a nitrogen atmosphere, followed by addition of 7.9 parts of ion-exchanged water and 0.1 parts of potassium persulfate thereto. A mixture of 10.0 parts of butyl methacrylate, 3.0 parts of methacrylic acid, 3.0 parts of 1,4-butanediol dimethacrylate, and 3.0 parts of Aqualon KH-05 (manufactured by Dai-ichi Kogyo Seiyaku Co., Ltd.) was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous potassium hydroxide (KOH) solution thereto to give a polymer particle dispersion 1 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.
Preparation of Polymer Particle Dispersion 2

The dispersion (75.0 parts) of the first layer prepared in the [Preparation of polymer particle dispersion 1] was heated to 70 degrees Celsius under a nitrogen atmosphere, followed by addition of 18.5 parts of ion-exchanged water and 0.04 parts of potassium persulfate thereto. A mixture of 2.0 parts of butyl methacrylate, 1.0 parts of methacrylic acid, 0.5 parts of 1,4-butanediol dimethacrylate, and 3.0 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 2 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.
Preparation of Polymer Particle Dispersion 3

The dispersion (50.0 parts) of the first layer prepared in the [Preparation of polymer particle dispersion 1] was heated to 70 degrees Celsius under a nitrogen atmosphere, followed by addition of 28.9 parts of ion-exchanged water and 0.13 parts of potassium persulfate thereto. A mixture of 10.0 parts of butyl methacrylate, 4.0 parts of methacrylic acid, 4.0 parts of 1,4-butanediol dimethacrylate, and 3.0 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 3 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.
Preparation of Polymer Particle Dispersion 4

The dispersion (73.0 parts) of the first layer prepared in the [Preparation of polymer particle dispersion 1] was heated to 70 degrees Celsius under a nitrogen atmosphere, followed by addition of 7.9 parts of ion-exchanged water and 0.1 parts of potassium persulfate thereto. A mixture of 10.0 parts of butyl methacrylate, 0.5 parts of methacrylic acid, 4.0 parts of 1,4-butanediol dimethacrylate, and 4.0 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 4 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 5

The dispersion (75.0 parts) of the first layer prepared in the [Preparation of polymer particle dispersion 1] was heated to 70 degrees Celsius under a nitrogen atmosphere, followed by addition of 6.9 parts of ion-exchanged water and 0.1 parts of potassium persulfate thereto. A mixture of 10.0 parts of butyl methacrylate, 4.0 parts of methacrylic acid, 1.0 parts of 1,4-butanediol dimethacrylate, and 3.0 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 5 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 6

The dispersion (50.0 parts) of the first layer prepared in the [Preparation of polymer particle dispersion 1] was heated to 70 degrees Celsius under a nitrogen atmosphere, followed by addition of 21.8 parts of ion-exchanged water and 0.17 parts of potassium persulfate thereto. A mixture of 1.0 parts of butyl methacrylate, 2.0 parts of methacrylic acid, 15.0 parts of 1,4-butanediol dimethacrylate, and 10.0 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 6 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 7

The dispersion (70.0 parts) of the first layer prepared in the [Preparation of polymer particle dispersion 1] was heated to 70 degrees Celsius under a nitrogen atmosphere, followed by addition of 4.3 parts of ion-exchanged water and 0.15 parts of potassium persulfate thereto. A mixture of 0.5 parts of butyl methacrylate, 18.0 parts of methacrylic acid, 4.0 parts of 1,4-butanediol dimethacrylate, and 3.0 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 7 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 8

The dispersion (75.0 parts) of the first layer prepared in the [Preparation of polymer particle dispersion 1] was heated to 70 degrees Celsius under a nitrogen atmosphere, followed by addition of 8.5 parts of ion-exchanged water and 0.1 parts of potassium persulfate thereto. A mixture of 10.0 parts of butyl methacrylate, 3.0 parts of methacrylic acid, 3.0 parts of 1,4-butanediol dimethacrylate, and 0.5 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 8 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 9

A mixture of 35.0 parts of butyl methacrylate, 2.0 parts of n-hexadecane, and 2.0 parts of 2,2'-azobis-(2-methylbutyronitrile) was stirred for 30 minutes. The mixture solution was dropwise added to 61.0 parts of an aqueous solution of 5.0% by mass of Nikkol BC20 (manufactured by Nikko Chemicals Co., Ltd.) as a polyoxyethylene cetyl ether, followed by stirring for 30 minutes. Subsequently, the mixture solution was subjected to dispersion treatment with an ultrasonic processor, S-150D Digital Sonifier, under conditions of 400 W and 20 kHz for 3 hours, followed by polymerization under a nitrogen atmosphere at 80 degrees Celsius for 4 hours to give a dispersion of the first layer for polymer particles.

Subsequently, 75.0 parts of the dispersion of the first layer prepared above was heated to 70 degrees Celsius under a nitrogen atmosphere, followed by addition of 5.9 parts of ion-exchanged water and 0.1 parts of potassium persulfate thereto. A mixture of 10.0 parts of butyl methacrylate, 3.0 parts of methacrylic acid, 3.0 parts of glycerin dimethacrylate, and 3.0 parts of Maxemul 6106 (manufactured by Croda Inc.) was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 9 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 10

A mixture of 35.0 parts of butyl methacrylate, 1.0 parts of 1,4-butanediol dimethacrylate, 1.0 parts of methacrylic acid, and 2.0 parts of Aqualon KH-05 was emulsified. The resulting emulsion was dropwise added to a mixture of 60.9 parts of ion-exchanged water and 0.1 parts of potassium persulfate over 3 hours with stirring under a nitrogen atmosphere at 80 degrees Celsius for polymerization to give a dispersion of the first layer for polymer particles.

Subsequently, 75.0 parts of the dispersion of the first layer prepared above was heated to 70 degrees Celsius under a nitrogen atmosphere, followed by addition of 5.9 parts of ion-exchanged water and 0.1 parts of potassium persulfate thereto. A mixture of 10.0 parts of butyl methacrylate, 3.0 parts of methacrylic acid, 3.0 parts of 1,4-butanediol dimethacrylate, and 3.0 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 10 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 11

The dispersion (80.0 parts) of the first layer prepared in the [Preparation of polymer particle dispersion 1] was heated to 70 degrees Celsius under a nitrogen atmosphere, followed by addition of 13.9 parts of ion-exchanged water and 0.1 parts of potassium persulfate thereto. A mixture of 1.5 parts of butyl methacrylate, 1.0 parts of methacrylic acid, 0.5 parts of 1,4-butanediol dimethacrylate, and 3.0 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 11 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 12

The dispersion (30.0 parts) of the first layer prepared in the [Preparation of polymer particle dispersion 1] was heated to 70 degrees Celsius under a nitrogen atmosphere, followed by addition of 45.9 parts of ion-exchanged water and 0.15 parts of potassium persulfate thereto. A mixture of 7.0 parts of butyl methacrylate, 7.0 parts of methacrylic acid, 7.0 parts of 1,4-butanediol dimethacrylate, and 3.0 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 12 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 13

The dispersion (75.0 parts) of the first layer prepared in the [Preparation of polymer particle dispersion 1] was heated to 70 degrees Celsius under a nitrogen atmosphere, followed by addition of 7.4 parts of ion-exchanged water and 0.10 parts of potassium persulfate thereto. A mixture of 10.0 parts of butyl methacrylate, 4.0 parts of methacrylic acid, 0.5 parts of 1,4-butanediol dimethacrylate, and 3.0 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 13 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 14

The dispersion (50.0 parts) of the first layer prepared in the [Preparation of polymer particle dispersion 1] was heated to 70 degrees Celsius under a nitrogen atmosphere, followed by addition of 31.9 parts of ion-exchanged water and 0.1 parts of potassium persulfate thereto. A mixture of 0.5 parts of butyl methacrylate, 0.5 parts of methacrylic acid, 14.0 parts of 1,4-butanediol dimethacrylate, and 3.0 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 14 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 15

The dispersion (75.0 parts) of the first layer prepared in the [Preparation of polymer particle dispersion 1] was heated to 70 degrees Celsius under a nitrogen atmosphere, followed by addition of 8.5 parts of ion-exchanged water and 0.10 parts of potassium persulfate thereto. A mixture of 10.0 parts of butyl methacrylate, 3.0 parts of methacrylic acid, 3.0 parts of 1,4-butanediol dimethacrylate, and 0.25 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 15 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 16

A mixture of 47.1 parts of butyl methacrylate and 0.5 parts of Aqualon KH-05 was emulsified. The resulting emulsion was dropwise added to a mixture of 52.3 parts of ion-exchanged water and 0.1 parts of potassium persulfate over 3 hours with stirring under a nitrogen atmosphere at 80 degrees Celsius for polymerization to give a dispersion of the first layer for polymer particles.

Subsequently, 47.4 parts of the dispersion of the first layer prepared above was heated to 70 degrees Celsius under a nitrogen atmosphere, followed by addition of 29.7 parts of ion-exchanged water and 0.1 parts of potassium persulfate thereto. A mixture of 7.4 parts of butyl methacrylate, 7.4 parts of methacrylic acid, 7.4 parts of 1,4-butanediol dimethactylate, and 0.5 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 16 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 17

A mixture of 13.0 parts of butyl methacrylate and 0.3 parts of Aqualon KH-05 was emulsified. The resulting emulsion was dropwise added to a mixture of 86.5 parts of ion-exchanged water and 0.1 parts of potassium persulfate over 1 hour with stirring under a nitrogen atmosphere at 80 degrees Celsius for polymerization to give a dispersion of the first layer for polymer particles.

Subsequently, 88.3 parts of the dispersion of the first layer prepared above was heated to 70 degrees Celsius under a nitrogen atmosphere, followed by addition of 5.1 parts of ion-exchanged water and 0.1 parts of potassium persulfate thereto. A mixture of 1.9 parts of butyl methacrylate, 2.5 parts of methacrylic acid, 1.9 parts of 1,4-butanediol dimethactylate, and 0.3 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 17 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 18

The dispersion (86.1 parts) of the first layer prepared in the [Preparation of polymer particle dispersion 17] was heated to 70 degrees Celsius under a nitrogen atmosphere, followed by addition of 5.0 parts of ion-exchanged water and 0.1 parts of potassium persulfate thereto. A mixture of 5.0 parts of methacrylic acid, 3.7 parts of 1,4-butanediol dimethacrylate, and 0.2 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 18 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 19

The dispersion (75.6 parts) of the first layer prepared in the [Preparation of polymer particle dispersion 17] was heated to 70 degrees Celsius under a nitrogen atmosphere, followed by addition of 8.7 parts of ion-exchanged water and 0.1 parts of potassium persulfate thereto. A mixture of 8.7 parts of methacrylic acid, 6.5 parts of 1,4-butanediol dimethacrylate, and 0.4 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 19 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 20

A mixture of 18.2 parts of butyl methacrylate and 0.4 parts of Aqualon KH-05 was emulsified. The resulting emulsion was dropwise added to a mixture of 81.0 parts of ion-exchanged water and 0.1 parts of potassium persulfate over 1 hour with stirring under a nitrogen atmosphere at 80 degrees Celsius for polymerization to give a dispersion of the first layer for polymer particles.

Subsequently, 92.9 parts of the dispersion of the first layer prepared above was heated to 70 degrees Celsius under a nitrogen atmosphere, followed by addition of 2.5 parts of ion-exchanged water and 0.1 parts of potassium persulfate thereto. A mixture of 2.5 parts of methacrylic acid, 2.0 parts of 1,4-butanediol dimethacrylate, and 0.1 parts of Aqualon KH-05 was emulsified. The resulting emulsion was dropwise added to the dispersion of the first layer over 0.5 hours. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 20 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 21

A mixture of 11.6 parts of butyl methacrylate and 0.7 parts of Aqualon KH-05 was emulsified. The resulting emulsion was dropwise added to a mixture of 87.3 parts of ion-exchanged water and 0.1 parts of potassium persulfate over 1 hour with stirring under a nitrogen atmosphere at 80 degrees Celsius for polymerization to give a dispersion of the first layer for polymer particles.

Subsequently, 86.0 parts of the dispersion of the first layer prepared above was heated to 70 degrees Celsius under a nitrogen atmosphere, followed by addition of 5.0 parts of ion-exchanged water and 0.1 parts of potassium persulfate thereto. A mixture of 5.0 parts of methacrylic acid, 3.8 parts of 1,4-butanediol dimethacrylate, and 0.3 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 21 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 22

A mixture of 8.9 parts of butyl methacrylate and 1.5 parts of Aqualon KH-05 was emulsified. The resulting emulsion was dropwise added to a mixture of 89.3 parts of ion-exchanged water and 0.1 parts of potassium persulfate over 1 hour with stirring under a nitrogen atmosphere at 80 degrees Celsius for polymerization to give a dispersion of the first layer for polymer particles.

Subsequently, 85.7 parts of the dispersion of the first layer prepared above was heated to 70 degrees Celsius under a nitrogen atmosphere, followed by addition of 5.1 parts of ion-exchanged water and 0.1 parts of potassium persulfate thereto. A mixture of 5.1 parts of methacrylic acid, 3.8 parts of 1,4-butanediol dimethacrylate, and 0.3 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 22 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 23

A mixture of 36.0 parts of butyl methacrylate and 4.2 parts of Aqualon KH-05 was emulsified. The resulting emulsion was dropwise added to a mixture of 57.9 parts of ion-exchanged water and 0.1 parts of potassium persulfate over 3 hours with stirring under a nitrogen atmosphere at 80 degrees Celsius for polymerization to give a dispersion of the first layer for polymer particles.

Subsequently, 80.0 parts of the dispersion of the first layer prepared above was heated to 70 degrees Celsius under a nitrogen atmosphere, followed by addition of 7.9 parts of ion-exchanged water and 0.1 parts of potassium persulfate thereto. A mixture of 2.0 parts of methacrylic acid, 5.0 parts of 1,4-butanediol dimethacrylate, and 3.0 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 23 having a polymer content of 15% by mass and a pH of 8.5. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 24

A polymer particle dispersion 24 was prepared as in the [Preparation of polymer particle dispersion 23] except that Adeka Reasoap ER-20 was used in place of Aqualon KH-05. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 25

A polymer particle dispersion 25 was prepared as in the [Preparation of polymer particle dispersion 23] except that Latemul PD-420 was used in place of Aqualon KH05. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 26

A polymer particle dispersion 26 was prepared as in the [Preparation of polymer particle dispersion 23] except that Emulsogen R307 was used in place of Aqualon KH05. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 27

A polymer particle dispersion 27 was prepared as in the [Preparation of polymer particle dispersion 23] except that Aqualon HS-10 was used in place of Aqualon KH05. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 28

A polymer particle dispersion 28 was prepared as in the [Preparation of polymer particle dispersion 23] except that Adeka Reasoap SR-20 was used in place of Aqualon KH-05. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 29

A polymer particle dispersion 29 was prepared as in the [Preparation of polymer particle dispersion 23] except that Latemul PD-105 was used in place of Aqualon KH05. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 30

A polymer particle dispersion 30 was prepared as in the [Preparation of polymer particle dispersion 23] except that Eleminol RS-3000 was used in place of Aqualon KH-05. The resulting polymer particles were each composed of three layers: a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 31

The dispersion of the first layer prepared in the [Preparation of polymer particle dispersion 10] was cooled to room temperature, followed by addition of ion-exchanged water and an aqueous KOH solution thereto to give a polymer particle dispersion 31 having a polymer content of 15% by mass and a pH of 8.5. The resulting polymer particles were each composed of an uncrosslinked monolayer.

Preparation of Polymer Particle Dispersion 32

A mixture of 36.3 parts of butyl methacrylate, 3.0 parts of methacrylic acid, 3.0 parts of 1,4-butanediol dimethacrylate, and 3.0 parts of Aqualon KH-05 was emulsified. The resulting emulsion was dropwise added to a mixture of 54.6 parts of ion-exchanged water and 0.1 parts of potassium persulfate over 3 hours with stirring under a nitrogen atmosphere at 80 degrees Celsius for polymerization. The reaction solution was then cooled to room temperature, followed by addition of ion-exchanged water and an aqueous KOH solution thereto to give a polymer particle dispersion 32 having a polymer content of 15% by mass and a pH of 8.5. The resulting polymer particles were each composed of a monolayer of a crosslinked polymer.

Preparation of Polymer Particle Dispersion 33

A mixture of 36.3 parts of butyl methacrylate, 3.0 parts of methacrylic acid, 3.0 parts of glycerin dimethacrylate, and 3.0 parts of Maxemul 6106 was emulsified. The resulting emulsion was dropwise added to a mixture of 54.6 parts of ion-exchanged water and 0.1 parts of potassium persulfate over 3 hours with stirring under a nitrogen atmosphere at 80 degrees Celsius for polymerization. The reaction solution was then cooled to room temperature, followed by addition of ion-exchanged water and an aqueous KOH solution thereto to give a polymer particle dispersion 33 having a polymer content of 15% by mass and a pH of 8.5. The resulting polymer particles were each composed of a monolayer of a crosslinked polymer.

Preparation of Polymer Particle Dispersion 34

The dispersion (73.0 parts) of the first layer prepared in the [Preparation of polymer particle dispersion 1] was heated to 70 degrees Celsius under a nitrogen atmosphere, followed by addition of 7.9 parts of ion-exchanged water and 0.1 parts of potassium persulfate thereto. A mixture of 10.0 parts of butyl methacrylate, 3.0 parts of methacrylic acid, 3.0 parts of 1,4-butanediol dimethacrylate, and 3.0 parts of Nikkol BC15 (manufactured by Nikko Chemicals Co., Ltd.) as a polyoxyethylene cetyl ether was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 34 having a polymer content of 15% by mass and a pH of 8.5. The resulting polymer particles were each composed of two layers: a first layer formed of an uncrosslinked polymer and a second layer formed of a crosslinked polymer having carboxyl groups as ionizable groups, in this order.

Preparation of Polymer Particle Dispersion 35

The dispersion (68.0 parts) of the first layer prepared in the [Preparation of polymer particle dispersion 1] was heated to 70 degrees Celsius under a nitrogen atmosphere, followed by addition of 7.9 parts of ion-exchanged water and 0.1 parts of potassium persulfate thereto. A mixture of 8.0 parts of butyl methacrylate, 10.0 parts of methacrylic acid, 3.0 parts of 1,4-butanediol dimethacrylate, and 3.0 parts of Nikkol BC15 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer content of 20% by mass and a pH of 8.5. The Nikkol BC15 was removed by ultrafiltration, which was continued until the surface tension of the filtrate reached 70 mN/m. Subsequently, ion-exchanged water and an aqueous KOH solution were added to the filtrate to give a polymer particle dispersion 35 having a polymer content of 15% by mass and a pH of 8.5. The resulting polymer particles were each composed of two layers: a first layer formed of an uncrosslinked polymer and a second layer formed of a crosslinked polymer having carboxyl groups as ionizable groups, in this order.

[Preparation of Polymer Particle Dispersion 36]

A mixture of 35.0 parts of butyl methacrylate, 10.0 parts of methacrylic acid, and 3.0 parts of Nikkol BC15 was emulsified. The resulting emulsion was dropwise added to a mixture of 51.9 parts of ion-exchanged water and 0.1 parts of potassium persulfate over 3 hours with stirring under a nitrogen atmosphere at 80 degrees Celsius for polymerization. The reaction solution was then cooled to room temperature, followed by addition of ion-exchanged water and an aqueous KOH solution thereto to give a polymer particle dispersion 36 having a polymer content of 15% by mass and a pH of 8.5. The resulting polymer particles were each composed of an uncrosslinked monolayer.

Preparation of Polymer Particle Dispersion 37

Nikkol BC15 was removed therefrom by ultrafiltration from the polymer particle dispersion 36, whose polymer content was adjusted to 20% by mass, and the ultrafiltration was continued until the surface tension of the filtrate reached 70 mN/m. Subsequently, ion-exchanged water and an aqueous KOH solution were added to the filtrate to give a polymer particle dispersion 37 having a polymer content of 15% by mass and a pH of 8.5. The resulting polymer particles were each composed of an uncrosslinked monolayer.

TABLE 1

Preparation conditions and physical properties of polymer particle dispersions

| Polymer particle dispersion No | Ratio of first layer to polymer particle (% by mass) | Ratio of second layer to polymer particle (% by mass) | Ratio of third layer to polymer particle (% by mass) | Units derived from crosslinkable monomer in second layer/units derived monomer having ionic group (times) | Thickness of first layer (nm) | Thickness of second layer (nm) |
|---|---|---|---|---|---|---|
| Polymer particle dispersion 1 | 58.7 | 34.8 | 6.5 | 1.00 | 175.0 | 14.7 |
| Polymer particle dispersion 2 | 81.0 | 10.2 | 8.8 | 0.50 | 175.0 | 3.5 |
| Polymer particle dispersion 3 | 46.8 | 45.6 | 7.6 | 1.00 | 175.0 | 22.2 |
| Polymer particle dispersion 4 | 59.3 | 31.9 | 8.8 | 8.00 | 175.0 | 13.5 |
| Polymer particle dispersion 5 | 60.7 | 32.8 | 6.6 | 0.25 | 175.0 | 13.6 |
| Polymer particle dispersion 6 | 39.8 | 38.7 | 21.5 | 7.50 | 175.0 | 22.2 |
| Polymer particle dispersion 7 | 50.4 | 43.8 | 5.8 | 0.22 | 175.0 | 20.3 |
| Polymer particle dispersion 8 | 62.7 | 36.2 | 1.1 | 1.00 | 175.0 | 14.3 |
| Polymer particle dispersion 9 | 59.4 | 34.2 | 6.4 | 1.00 | 175.0 | 14.3 |
| Polymer particle dispersion 10 | 59.4 | 34.2 | 6.4 | 1.00 | 181.0 | 14.8 |
| Polymer particle dispersion 11 | 83.1 | 8.4 | 8.4 | 0.50 | 175.0 | 2.9 |
| Polymer particle dispersion 12 | 31.6 | 59.8 | 8.5 | 1.00 | 175.0 | 37.2 |
| Polymer particle dispersion 13 | 61.3 | 32.0 | 6.6 | 0.13 | 175.0 | 13.2 |
| Polymer particle dispersion 14 | 50.7 | 41.1 | 8.2 | 28.00 | 175.0 | 19.2 |
| Polymer particle dispersion 15 | 63.1 | 36.4 | 0.6 | 1.00 | 175.0 | 14.3 |
| Polymer particle dispersion 16 | 49.7 | 49.2 | 1.1 | 1.00 | 420.0 | 54.1 |
| Polymer particle dispersion 17 | 63.9 | 34.7 | 1.4 | 0.75 | 50.0 | 3.9 |
| Polymer particle dispersion 18 | 56.1 | 42.7 | 1.2 | 0.75 | 50.0 | 5.2 |
| Polymer particle dispersion 19 | 39.0 | 59.3 | 1.7 | 0.75 | 50.0 | 9.0 |
| Polymer particle dispersion 20 | 78.9 | 20.6 | 0.6 | 0.80 | 61.0 | 2.5 |
| Polymer particle dispersion 21 | 54.1 | 44.6 | 1.3 | 0.75 | 26.0 | 2.9 |
| Polymer particle dispersion 22 | 49.3 | 49.3 | 1.4 | 0.75 | 26.0 | 3.4 |
| Polymer particle dispersion 23 | 73.6 | 19.5 | 6.9 | 2.50 | 213.0 | 8.7 |
| Polymer particle dispersion 24 | 73.6 | 19.5 | 6.9 | 2.50 | 225.0 | 9.2 |
| Polymer particle dispersion 25 | 73.6 | 19.5 | 6.9 | 2.50 | 233.0 | 9.5 |
| Polymer particle dispersion 26 | 73.6 | 19.5 | 6.9 | 2.50 | 261.0 | 10.6 |
| Polymer particle dispersion 27 | 73.6 | 19.5 | 6.9 | 2.50 | 244.0 | 9.9 |
| Polymer particle dispersion 28 | 73.6 | 19.5 | 6.9 | 2.50 | 181.0 | 7.4 |
| Polymer particle dispersion 29 | 73.6 | 19.5 | 6.9 | 2.50 | 222.0 | 9.0 |
| Polymer particle dispersion 30 | 73.6 | 19.5 | 6.9 | 2.50 | 205.0 | 8.3 |
| Polymer particle dispersion 31 | — | — | — | — | — | — |
| Polymer particle dispersion 32 | — | — | — | — | — | — |
| Polymer particle dispersion 33 | — | — | — | — | — | — |
| Polymer particle dispersion 34 | 58.7 | 34.8 | — | 1.00 | 175.0 | 14.7 |
| Polymer particle dispersion 35 | 51.2 | 42.7 | — | 0.30 | 175.0 | 19.6 |
| Polymer particle dispersion 36 | — | — | — | — | — | — |
| Polymer particle dispersion 37 | — | — | — | — | — | — |

| Polymer particle dispersion No | Thickness of first layer/ thickness of second layer (times) | Volume-average particle diameter $D_{50}$ (nm) | Surface electric charge (micromole/ $m^2$) | THF-insoluble fraction (%) |
|---|---|---|---|---|
| Polymer particle dispersion 1 | 11.9 | 204.4 | 4.0 | 59.0 |
| Polymer particle dispersion 2 | 49.5 | 182.1 | 5.0 | 30.0 |
| Polymer particle dispersion 3 | 7.9 | 219.5 | 4.0 | 72.0 |
| Polymer particle dispersion 4 | 13.0 | 202.0 | 0.8 | 66.0 |
| Polymer particle dispersion 5 | 12.9 | 202.1 | 5.0 | 49.0 |
| Polymer particle dispersion 6 | 7.9 | 219.5 | 4.0 | 78.0 |
| Polymer particle dispersion 7 | 8.6 | 215.6 | 10.0 | 67.0 |
| Polymer particle dispersion 8 | 12.2 | 203.7 | 4.0 | 62.0 |
| Polymer particle dispersion 9 | 12.2 | 203.7 | 4.0 | 61.0 |
| Polymer particle dispersion 10 | 12.2 | 210.7 | 4.0 | 55.0 |
| Polymer particle dispersion 11 | 61.2 | 180.7 | 5.0 | 22.0 |
| Polymer particle dispersion 12 | 4.7 | 249.3 | 7.0 | 89.0 |
| Polymer particle dispersion 13 | 13.3 | 201.3 | 5.0 | 26.0 |
| Polymer particle dispersion 14 | 9.1 | 213.3 | 2.0 | 85.0 |
| Polymer particle dispersion 15 | 12.2 | 203.7 | 4.0 | 62.0 |
| Polymer particle dispersion 16 | 7.8 | 528.2 | 2.0 | 46.0 |
| Polymer particle dispersion 17 | 12.8 | 57.8 | 6.0 | 58.0 |
| Polymer particle dispersion 18 | 9.6 | 60.4 | 18.0 | 61.0 |
| Polymer particle dispersion 19 | 5.5 | 68.1 | 22.0 | 61.0 |
| Polymer particle dispersion 20 | 24.9 | 65.9 | 12.0 | 41.0 |
| Polymer particle dispersion 21 | 9.0 | 31.8 | 18.0 | 77.0 |
| Polymer particle dispersion 22 | 7.7 | 32.8 | 22.0 | 77.0 |
| Polymer particle dispersion 23 | 24.6 | 230.3 | 5.0 | 70.0 |
| Polymer particle dispersion 24 | 24.6 | 243.3 | 4.0 | 68.0 |
| Polymer particle dispersion 25 | 24.6 | 252.0 | 4.0 | 66.0 |
| Polymer particle dispersion 26 | 24.6 | 282.2 | 3.0 | 59.0 |
| Polymer particle dispersion 27 | 24.6 | 263.9 | 3.0 | 62.0 |

TABLE 1-continued

Preparation conditions and physical properties of polymer particle dispersions

| | | | | |
|---|---|---|---|---|
| Polymer particle dispersion 28 | 24.6 | 195.7 | 5.0 | 70.0 |
| Polymer particle dispersion 29 | 24.6 | 240.1 | 4.0 | 68.0 |
| Polymer particle dispersion 30 | 24.6 | 221.7 | 4.0 | 71.0 |
| Polymer particle dispersion 31 | | 181.0 | 6.0 | 0 |
| Polymer particle dispersion 32 | | 968.0 | 4.0 | 99.0 |
| Polymer particle dispersion 33 | | 1250.0 | 3.0 | 98.0 |
| Polymer particle dispersion 34 | 11.9 | 204.4 | 5.0 | 44.0 |
| Polymer particle dispersion 35 | 8.9 | 214.2 | 7.0 | 49.0 |
| Polymer particle dispersion 36 | | 181.0 | 10.0 | 0 |
| Polymer particle dispersion 37 | | 181.0 | 10.0 | 0 |

[Preparation of Polymer Particle Dispersion 38]

A mixture of 42.0 parts of butyl methacrylate, 2.0 parts of n-hexadecane as hydrophobe, and 2.0 parts of 2,2'-azobis-(2-methylbutyronitrile) was stirred for 30 min. The mixture solution was dropwise added to 50.0 parts of an aqueous solution of 18.5% by mass of Nikkol BC15, followed by stirring for 30 minutes. Subsequently, the mixture solution was subjected to dispersion treatment with an ultrasonic processor, S150D Digital Sonifier (manufactured by Branson Co.), under conditions of 400 W and 20 kHz for 3 hours, followed by polymerization under a nitrogen atmosphere at 80 degrees Celsius for 4 hours to give a dispersion of core particles for polymer particles.

Subsequently, 20.0 parts of the dispersion of core particles prepared above was heated to 70 degrees Celsius under a nitrogen atmosphere, followed by addition of 9.0 parts of ion-exchanged water and 0.1 parts of potassium persulfate thereto. A mixture of 44.0 parts of butyl methacrylate and 0.5 parts of Aqualon KH-05 (manufactured by Dai-ichi Kogyo Seiyaku Co., Ltd.) was emulsified. The resulting emulsion was dropwise added to the dispersion of core particles over 2 hours to give a dispersion of core particles each provided with a first layer.

Subsequently, the dispersion of the first layer prepared above was heated to 70 degrees Celsius under a nitrogen atmosphere, followed by addition of 7.9 parts of ion-exchanged water and 0.1 parts of potassium persulfate thereto with heating at the same temperature. A mixture of 10.0 parts of butyl methacrylate, 3.0 parts of methacrylic acid, 3.0 parts of 1,4-butanediol dimethacrylate, and 1.5 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 38 having a polymer content of 15% by mass and a pH of 8.5. The resulting polymer particles were each composed of four layers: an uncrosslinked core particle, a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 39

A mixture of 42.0 parts of butyl methacrylate, 2.0 parts of n-hexadecane as hydrophobe, and 2.0 parts of 2,2'-azobis-(2-methylbutyronitrile) was stirred for 30 min. The mixture solution was dropwise added to 50.0 parts of an aqueous solution of 18.5% by mass of Nikkol BC15, followed by stirring for 30 minutes. Subsequently, the mixture solution was subjected to dispersion treatment with an ultrasonic processor, S150D Digital Sonifier (manufactured by Branson Co.), under conditions of 400 W and 20 kHz for 3 hours, followed by polymerization under a nitrogen atmosphere at 80 degrees Celsius for 4 hours to give a dispersion of core particles for polymer particles.

Subsequently, 20.0 parts of the dispersion of core particles prepared above was heated to 70 degrees Celsius under a nitrogen atmosphere, followed by addition of 3.0 parts of ion-exchanged water and 0.1 parts of potassium persulfate thereto. A mixture of 2.5 parts of butyl methacrylate, 1.5 parts of 1,4-butanediol dimethacrylate, and 0.5 parts of Aqualon KH-05 was emulsified. The resulting emulsion was dropwise added to the dispersion of core particles over 0.5 hours to give a dispersion of particles each composed of the core particle and a layer crosslinked thereto.

Subsequently, the dispersion of core particles each composed of a core particle and a layer crosslinked thereto prepared above was heated to 70 degrees Celsius under a nitrogen atmosphere, followed by addition of 22.0 parts of ion-exchanged water and 0.1 parts of potassium persulfate thereto. A mixture of 33.0 parts of butyl methacrylate and 0.5 parts of Aqualon KH-05 was emulsified. The resulting emulsion was dropwise added to the dispersion of core particles each provided with a layer crosslinked thereto over 2.0 hours to give a dispersion of particles each provided with a first layer.

Subsequently, the dispersion of the first layer prepared above was heated to 70 degrees Celsius under a nitrogen atmosphere, followed by addition of 5.0 parts of ion-exchanged water and 0.1 parts of potassium persulfate thereto with heating at the same temperature. A mixture of 7.0 parts of butyl methacrylate, 1.5 parts of methacrylic acid, 1.5 parts of 1,4-butanediol dimethacrylate, and 1.5 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 39 having a polymer content of 15% by mass and a pH of 8.5. The resulting polymer particles were each composed of five layers: an uncrosslinked core particle, a crosslinked layer, a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 40

A mixture of 35.0 parts of butyl methacrylate, 7.0 parts of 1,4-butanediol dimethacrylate, 2.0 parts of n-hexadecane as hydrophobe, and 2.0 parts of 2,2'-azobis-(2-methylbutyronitrile) was stirred for 30 min. The mixture solution was dropwise added to 50.0 parts of an aqueous solution of 18.5% by mass of Nikkol BC15, followed by stirring for 30 minutes. Subsequently, the mixture solution was subjected to dispersion treatment with an ultrasonic processor, S-150D Digital Sonifier (manufactured by Branson Co.), under conditions of 400 W and 20 kHz for 3 hours, followed by polymerization under a nitrogen atmosphere at 80 degrees Celsius for 4 hours to give a dispersion of core particles for polymer particles.

Subsequently, 20.0 parts of the dispersion of core particles prepared above was heated to 70 degrees Celsius under a nitrogen atmosphere, followed by addition of 8.0 parts of ion-exchanged water and 0.1 parts of potassium persulfate thereto. A mixture of 44.5 parts of butyl methacrylate and 0.5 parts of Aqualon KH-05 was emulsified. The resulting emulsion was dropwise added to the dispersion of core particles over 2 hours to give a dispersion of core particles each provided with a first layer.

Subsequently, the dispersion of the first layer prepared above was heated to 70 degrees Celsius under a nitrogen atmosphere, followed by addition of 7.9 pans of ion-exchanged water and 0.1 parts of potassium persulfate thereto with heating at the same temperature. A mixture of 10.0 parts of butyl methacrylate, 3.0 parts of methacrylic acid, 3.0 parts of 1,4-butanediol dimethacrylate, and 3.0 parts of Aqualon KH-05 was emulsified. The resulting emulsion was dropwise added to the dispersion of the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer panicle dispersion 40 having a polymer content of 15% by mass and a pH of 8.5. The resulting polymer particles were each composed of four layers: a crosslinked core particle, a first layer formed of an uncrosslinked polymer, a second layer formed of a crosslinked polymer having carboxyl groups as ionizable groups, and a third layer formed of units each having a hydrophilic part and a hydrophobic part, in this order.

Preparation of Polymer Particle Dispersion 41

A mixture of 35.0 parts of butyl methacrylate, 7.0 parts of 1,4-butanediol dimethacrylate, 2.0 parts of n-hexadecane as hydrophobe, and 2.0 parts of 2,2'-azobis-(2-methylbutyronitrile) was stirred for 30 min. The mixture solution was dropwise added to 50.0 parts of an aqueous solution of 18.5% by mass of Nikkol BC15, followed by stirring for 30 minutes. Subsequently, the mixture solution was subjected to dispersion treatment with an ultrasonic processor, S-150I) Digital Sonifier (manufactured by Branson Co.), under conditions of 400 W and 20 kHz for 3 hours, followed by polymerization under a nitrogen atmosphere at 80 degrees Celsius for 4 hours to give a dispersion of core particles for polymer particles.

Subsequently, 20.0 parts of the dispersion of core particles prepared above was heated to 70 degrees Celsius under a nitrogen atmosphere, followed by addition of 24.0 parts of ion-exchanged water and 0.1 parts of potassium persulfate thereto. A mixture of 33.0 parts of butyl methacrylate and 0.5 parts of Aqualon KH-05 was emulsified. The resulting emulsion was dropwise added to the dispersion of core particles over 2.0 hours to give a dispersion of core particles each provided with a first layer.

Subsequently, the dispersion of the first layer prepared above was heated to 70 degrees Celsius under a nitrogen atmosphere, followed by addition of 3.0 parts of ion-exchanged water and 0.1 parts of potassium persulfate thereto. A mixture of 1.5 parts of butyl methacrylate, 0.5 parts of 1,4-butanediol dimethacrylate, and 0.5 parts of Aqualon KH-05 was emulsified. The resulting emulsion was dropwise added to the dispersion of the first layer over 0.5 hours to give a dispersion of particles each having a layer crosslinked to the first layer.

Subsequently, the dispersion of particles each having a layer crosslinked to the first layer prepared above was heated to 70 degrees Celsius under a nitrogen atmosphere, followed by addition of 5.0 parts of ion-exchanged water and 0.1 parts of potassium persulfate thereto with heating at the same temperature. A mixture of 7.0 parts of butyl methacrylate, 1.5 parts of methacrylic acid, 1.5 parts of 1,4-butanediol dimethacrylate, and 1.5 parts of Aqualon KH-05 was emulsified. The resulting emulsion was dropwise added to the dispersion of the particles each having a layer crosslinked to the first layer over 1 hour. After the dropping, the mixture was heated to 85 degrees Celsius and was stirred for 2 hours. The reaction solution was then cooled to room temperature, followed by addition of ion-exchanged water and an aqueous KOH solution thereto to give a polymer particle dispersion 41 having a polymer content of 15% by mass and a pH of 8.5. The resulting polymer particles were each composed of five layers: a crosslinked core particle, a first layer formed of an uncrosslinked polymer, a crosslinked layer, a second layer formed of a crosslinked polymer having carboxyl groups as ionizable groups, and a third layer formed of units each having a hydrophilic part and a hydrophobic part, in this order.

TABLE 2

Preparation conditions and physical properties of polymer particle dispersions

| Polymer particle dispersion No. | Ratio of first layer to polymer particle (% by mass) | Ratio of second layer to polymer particle (% by mass) | Ratio of third layer to polymer particle (% by mass) | Units derived from crosslinkable monomer in second layer/units derived monomer having ionic group (times) | Thickness of first layer (nm) | Thickness of second layer (nm) |
| --- | --- | --- | --- | --- | --- | --- |
| Polymer particle dispersion 38 | 62.6 | 22.8 | 4.3 | 1.00 | 33.4 | 6.7 |
| Polymer particle dispersion 39 | 59.1 | 17.9 | 2.7 | 1.00 | 66.8 | 4.9 |
| Polymer particle dispersion 40 | 61.5 | 22.1 | 4.1 | 1.00 | 24.1 | 4.8 |
| Polymer particle dispersion 41 | 60.2 | 18.2 | 2.7 | 1.00 | 20.0 | 3.5 |

TABLE 2-continued

Preparation conditions and physical properties of polymer particle dispersions

| Polymer particle dispersion No. | Thickness of first layer/ thickness of second layer (times) | Volume- average particle diameter $D_{50}$ (nm) | Surface electric charge micromole/ $m^2$ | THF- insoluble fraction (%) |
|---|---|---|---|---|
| Polymer particle dispersion 38 | 5.0 | 159.3 | 6.0 | 42.0 |
| Polymer particle dispersion 39 | 13.8 | 146.8 | 6.0 | 48.0 |
| Polymer particle dispersion 40 | 5.0 | 115.0 | 8.0 | 69.0 |
| Polymer particle dispersion 41 | 5.7 | 105.6 | 7.0 | 61.0 |

Preparation of Polymer Particle Dispersion 42

A polymer particle dispersion 42 having a polymer content of 40% by mass and a pH of 8.9 was prepared as in Example 3 of PTL 4. The resulting polymer particles were each composed of three layers: a first layer formed of an uncrosslinked polymer, a second layer formed of a cross-linked polymer not having any ionizable group, and a third layer formed of units each having a hydrophilic part and a hydrophobic part, in this order.

Preparation of Polymer Particle Dispersion 43

A polymer particle dispersion 43 having a polymer content of 40% by mass and a pH of 8.9 was prepared as in Example 9 of PTL 4. The resulting polymer particles were each composed of three layers: a first layer formed of a crosslinked polymer, a second layer formed of a crosslinked polymer having sulfonate groups as ionizable groups, and a third layer formed of units each having a hydrophilic part and a hydrophobic part, in this order.

Preparation of Pigment Dispersion

A styrene-ethyl acrylate-acrylic acid copolymer having an acid value of 150 mg KOH/g and a weight-average molecular weight of 8000 was neutralized with an aqueous 10% by mass potassium hydroxide solution to give an aqueous polymer solution having a polymer content of 20.0% by mass. A mixture of 30 parts of the aqueous polymer solution, 20 parts of carbon black Monarch 1100 (manufactured by Cabot Corporation), and 50 parts of ion-exchanged water was subjected to dispersion treatment with a batch-type vertical sand mill (manufactured by Imex Co., Ltd.) filled with 200 parts of zirconia beads having a particle size of 0.3 mm for 5 hours. Then, coarse particles were removed by centrifugation, and pressure filtration was performed using a micro-filter having a pore size of 3.0 micrometers (manufactured by Fujifilm Corporation) to give a pigment dispersion (having a pigment content of 20% by mass and a polymer content of 6% by mass) in which the carbon black is dispersed in water by means of the polymer.

Preparation of Ink

Polymer particle dispersions prepared above were each prepared into an ink by sufficiently stirring a mixture of the following components:

Polymer particle dispersion (polymer content: 15% by mass): 70.0% by mass.
Pigment dispersion (pigment content: 20% by mass, polymer content: 6% by mass): 10.0% by mass,
Glycerin: 10.0% by mass.
Diethylene glycol: 4.0% by mass,
Acetylenol E100 (surfactant manufactured by Kawaken Fine Chemicals Co., Ltd.): 1.0% by mass, and
Ion-exchanged water: 5.0% by mass.

The resulting dispersion was subjected to pressure filtration using a micro-filter having a pore size of 3.0 micrometers (manufactured by Fujifilm Corporation) to prepare each ink.

Evaluation

In the present invention, AA to B in the evaluation criteria of each evaluation item are acceptable levels, and C is an unacceptable level. Evaluations of [Discharge stability of ink] and [Abrasion resistance of image] were performed using an ink-jet recording apparatus, PIXUS Pro 9500 (manufactured by CANON KABUSHIKI KAISHA). In the ink-jet recording apparatus, an image recorded with a resolution of 600 by 600 dpi under conditions that a unit area of ¹⁄₆₀₀ inch square receives eight ink droplets each having a weight of 3.5 ng is defined as a recording duty of 100%.

Storage Stability of Ink

Each ink prepared above was put in an airtight container of Teflon (registered trademark) and was stored at room temperature for one month for a storage test. The viscosity of each ink was measured before and after the storage test. The rate of change in viscosity of each ink, i.e., (viscosity of an ink after the storage test)/(viscosity of the ink before the storage test), was calculated to evaluate the storage stability of the ink. An ink having a rate of change in viscosity closer to 1.0 has higher storage stability. The evaluation criteria of the storage stability of an ink are as follows:

AA: the rate of change in viscosity of an ink was less than 1.1,
A: the rate of change in viscosity of an ink was 1.1 or more and less than 1.2,
B: the rate of change in viscosity of an ink was 1.2 or more and less than 2.0, and
C: the rate of change in viscosity of an ink was 2.0 or more, or the viscosity of an ink after the storage test could not be measured.

The evaluation results are shown in Table 3.

Discharge Stability of Ink

An ink cartridge filled with each of the inks prepared above was installed into the ink-jet recording apparatus, and a solid image having a recording duty of 100% was recorded on 10 sheets of Canon photographic paper glossy gold GL-101 (manufactured by CANON KABUSHIKI KAISHA). Subsequently, the nozzle check pattern of the ink-jet recording apparatus was recorded on one sheet. The recorded nozzle check pattern was visually inspected to evaluate the discharge stability of the ink. The evaluation criteria of the discharge stability of an ink are as follows:

AA: Undischarge and shift in printing did not occur even when the temperature of the recording head rose to 50 degrees Celsius,
A: Undischarge and shift in printing slightly occurred when the temperature of the recording head rose to 50 degrees Celsius, but undischarge and shift in printing did not occur when the temperature of the recording head did not rise, B: Undischarge and shift in printing slightly occurred when the temperature of the recording head rose, but they were low enough to be ignored, and C: Undischarge and shift in printing occurred when the temperature of the recording head rose.

AA: No scratch was formed in the image,

A: Scratches were slightly formed in the image,

B: Scratches were formed in the image such that the white surface of the recording medium was slightly recognized, but they were unnoticeable, and C: Scratches were formed in the image such that the white surface of the recording medium was recognized.

The evaluation results are shown in Table 3.

TABLE 3

Evaluation results

| Example No. | Polymer particle dispersion No | Storage stability of ink | Discharge stability of ink | Abrasion resistance of image |
|---|---|---|---|---|
| Example 1 | Polymer particle dispersion 1 | AA | AA | AA |
| Example 2 | Polymer particle dispersion 2 | AA | A | AA |
| Example 3 | Polymer particle dispersion 3 | AA | AA | A |
| Example 4 | Polymer particle dispersion 4 | AA | B | AA |
| Example 5 | Polymer particle dispersion 5 | A | AA | AA |
| Example 6 | Polymer particle dispersion 6 | AA | AA | A |
| Example 7 | Polymer particle dispersion 7 | A | AA | AA |
| Example 8 | Polymer particle dispersion 8 | AA | A | AA |
| Example 9 | Polymer particle dispersion 9 | AA | AA | AA |
| Example 10 | Polymer particle dispersion 10 | AA | AA | AA |
| Example 11 | Polymer particle dispersion 11 | AA | B | AA |
| Example 12 | Polymer particle dispersion 12 | AA | AA | B |
| Example 13 | Polymer particle dispersion 13 | B | AA | AA |
| Example 14 | Polymer particle dispersion 14 | AA | AA | B |
| Example 15 | Polymer particle dispersion 15 | AA | B | AA |
| Example 16 | Polymer particle dispersion 16 | AA | AA | AA |
| Example 17 | Polymer particle dispersion 17 | AA | A | AA |
| Example 18 | Polymer particle dispersion 18 | AA | AA | AA |
| Example 19 | Polymer particle dispersion 19 | AA | AA | AA |
| Example 20 | Polymer particle dispersion 20 | AA | AA | AA |
| Example 21 | Polymer particle dispersion 21 | AA | AA | AA |
| Example 22 | Polymer particle dispersion 22 | AA | AA | AA |
| Example 23 | Polymer particle dispersion 23 | AA | AA | AA |
| Example 24 | Polymer particle dispersion 24 | AA | AA | AA |
| Example 25 | Polymer particle dispersion 25 | AA | AA | AA |
| Example 26 | Polymer particle dispersion 26 | AA | AA | AA |
| Example 27 | Polymer particle dispersion 27 | AA | AA | AA |
| Example 28 | Polymer particle dispersion 28 | AA | AA | AA |
| Example 29 | Polymer particle dispersion 29 | AA | AA | AA |
| Example 30 | Polymer particle dispersion 30 | AA | AA | AA |
| Example 31 | Polymer particle dispersion 38 | AA | AA | AA |
| Example 32 | Polymer particle dispersion 39 | AA | AA | AA |
| Example 33 | Polymer particle dispersion 40 | AA | AA | AA |
| Example 34 | Polymer particle dispersion 41 | AA | AA | AA |
| Comparative Example 1 | Polymer particle dispersion 31 | C | A | B |
| Comparative Example 2 | Polymer particle dispersion 32 | C | C | C |
| Comparative Example 3 | Polymer particle dispersion 33 | C | C | C |
| Comparative Example 4 | Polymer particle dispersion 34 | AA | C | AA |
| Comparative Example 5 | Polymer particle dispersion 35 | AA | C | AA |
| Comparative Example 6 | Polymer particle dispersion 36 | C | C | AA |
| Comparative Example 7 | Polymer particle dispersion 37 | C | C | AA |
| Comparative Example 8 | Polymer particle dispersion 42 | C | C | AA |
| Comparative Example 9 | Polymer particle dispersion 43 | A | B | C |

The evaluation results are shown in Table 3.

Abrasion Resistance of Image

An ink cartridge filled with each of the inks prepared above was installed into the ink-jet recording apparatus, and a solid image (200 mm square) having a recording duty of 100% was recorded on OK Top Coat (basis weight: 127.9 g) (manufactured by Oji Paper Co., Ltd.). The image was subjected to an abrasion test using a Gakushintype rubbing fastness tester (manufactured by Imoto Machinery Co., Ltd.) in accordance with JIS L 0849 under conditions of ten times of reciprocating motion with a load of 500 g. The image after the abrasion test was visually inspected for evaluating the abrasion resistance of the image. The evaluation criteria of the abrasion resistance of an image are as follows:

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-234026, filed Oct. 23, 2012 and Japanese Patent Application No. 2013-195540, filed Sep. 20, 2013, which are hereby incorporated by reference herein in their entirety.

The invention claimed is:

1. An ink for ink-jet recording comprising polymer particles, wherein
the polymer particles each include a first layer, a second layer, and a third layer from the inside to the outside in this order, wherein
the first layer is formed of a first polymer having a tetrahydrofuran-insoluble fraction of 25% by mass or less;
the second layer is formed of a second polymer having ionizable groups and a tetrahydrofuran-insoluble fraction of higher than 25% by mass; and
the third layer is formed of units each having a hydrophilic part and a hydrophobic part.

2. The ink for ink-jet recording according to claim 1, wherein
the first layer of the polymer particle is a core particle; and
the polymer particle includes the second layer and the third layer from the core particle to the outside in this order.

3. The ink for ink-jet recording according to claim 1, wherein
the polymer particle includes a core particle and includes the first layer, the second layer, and the third layer from the core particle to the outside in this order.

4. The ink for ink-jet recording according to claim 1, wherein
the unit having a hydrophilic part and a hydrophobic part constituting the third layer of the polymer particle includes at least one selected from the group consisting of hydroxyl groups, ionizable groups, methylene oxide groups, and ethylene oxide groups as the hydrophilic part and at least one selected from the group consisting of alkyl groups, aryl groups, and alkylene oxide groups having 3 or more carbon atoms as the hydrophobic part.

5. The ink for ink-jet recording according to claim 1, wherein
the unit having a hydrophilic part and a hydrophobic part constituting the third layer of the polymer particle is derived from a reactive surfactant.

6. The ink for ink-jet recording according to claim 5, wherein the unit derived from a reactive surfactant is chemically bonded to at least one of the first layer and the second layer.

7. The ink for ink-jet recording according to claim 1, wherein
the polymer particle has a tetrahydrofuran-insoluble fraction of 80% by mass or less.

8. The ink for ink-jet recording according to claim 1, wherein
the second polymer constituting the second layer of the polymer particle includes units derived from a crosslinkable monomer and units derived from a monomer having an ionizable group; and
the mass ratio of the units derived from a crosslinkable monomer to the units derived from a monomer having an ionizable group in the second polymer is 0.20 or more.

9. The ink for ink-jet recording according to claim 1, wherein
the first layer of the polymer particle is formed by using an uncrosslinkable monomer and a crosslinkable monomer; and
the amount of the crosslinkable monomer is 5% by mass or less based on the total amount of the monomers used for the first layer.

10. The ink for ink-jet recording according to claim 1, wherein
the first layer of the polymer particle has a thickness 5 to 60 times the thickness of the second layer.

11. An ink cartridge comprising an ink storage portion for storing an ink, wherein
the ink storage portion stores an ink for ink-jet recording according to claim 1.

12. An ink-jet recording process comprising discharging an ink from a recording head by means of thermal energy, wherein
the ink is for ink-jet recording according to claim 1.

13. The ink for ink-jet recording according to claim 1, wherein
the first layer of the polymer particle is formed by using only an uncrosslinkable monomer.

14. The ink for ink-jet recording according to claim 8 or 9, wherein
the crosslinkable monomer is selected from monomers having two or more ethylene unsaturated bonds.

15. The ink for ink-jet recording according to claim 1, wherein
the polymer particles has a volume-average particle diameter of 50 nm or more and 100 nm or less.

16. The ink for ink-jet recording according to claim 1, wherein
the polymer particles has a surface electric charge of 1 micromole/$m^2$ or more and 50 micromole/$m^2$ or less.

17. The ink for ink-jet recording according to claim 1, wherein
the ink further comprises a color material.

* * * * *